(12) United States Patent
Walker et al.

(10) Patent No.: US 7,231,394 B2
(45) Date of Patent: Jun. 12, 2007

(54) INCREMENTAL BOTTOM-UP CONSTRUCTION OF DATA DOCUMENTS

(75) Inventors: Toby Walker, San Jose, CA (US); Hawley K. Rising, III, San Jose, CA (US); Ali Tabatabai, Cupertino, CA (US); Mohammed Z. Visharam, Santa Clara, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 562 days.

(21) Appl. No.: 10/112,406

(22) Filed: Mar. 28, 2002

(65) Prior Publication Data

US 2003/0028557 A1    Feb. 6, 2003

Related U.S. Application Data (60) Provisional application No. 60/306,256, filed on Jul. 17, 2001.

(51) Int. Cl.
*G06F 17/30* (2006.01)
(52) U.S. Cl. .......................... 707/101; 707/1
(58) Field of Classification Search .............. 707/1–10, 707/100–104.1; 717/136; 709/231, 223; 345/619
See application file for complete search history.

(56) References Cited

U.S. PATENT DOCUMENTS

| | | | |
|---|---|---|---|
| 4,764,867 A | 8/1988 | Hess | 715/853 |
| 5,579,471 A | 11/1996 | Barber et al. | 715/700 |
| 5,916,299 A | 6/1999 | Poppen | 701/202 |
| 6,016,494 A * | 1/2000 | Isensee et al. | 707/102 |
| 6,105,062 A * | 8/2000 | Andrews et al. | 709/223 |
| 6,377,957 B1 | 4/2002 | Jeyaraman | 707/200 |
| 6,393,427 B1 | 5/2002 | Vu et al. | 707/101 |
| 6,397,222 B1 | 5/2002 | Zellweger | 707/102 |
| 6,492,998 B1 | 12/2002 | Kim et al. | 215/223 |

(Continued)

OTHER PUBLICATIONS

ISO/IEC JTC 1/sc 29/WG 11, Oct. 19, 2000 ISO/IEC 14496-1:2001(E) (Systems) Document #: N3850 (This document integrates IDS/IEC 14496-1 :1999 (N2501), COR1 (N3278), and AMD1 (N3054).) Cover sheet, pp. 2, 8, 9, 10, 11, 57 & 58.

*Primary Examiner*—Yicun Wu
(74) *Attorney, Agent, or Firm*—Blakely, Sokoloff, Taylor & Zafman LLP (57) ABSTRACT

A data document is constructed by attaching a set of child nodes, selected from nodes in an existing data document or a document fragment, at an update location, which is a node in the existing data document or the document fragment that is identified by a navigation path. When the update command is a merge, one or mode nodes ("merge nodes") in the document fragment are identified as update locations, and the nodes in the existing data document are merged as child nodes of the merge nodes in the document fragment. When the update command is a join, a node ("join node") in the existing data document is identified as the update location, and an ordered list specifies which nodes in the existing data document and which nodes in the document fragment are to be joined as the set of child nodes for the join node. The join and merge update commands, navigation paths, and document fragments may transmitted as a series of fragment update units to construct the data document.

92 Claims, 9 Drawing Sheets

U.S. PATENT DOCUMENTS

| | | | |
|---|---|---|---|
| 6,564,263 B1 * | 5/2003 | Bergman et al. | 709/231 |
| 6,593,936 B1 * | 7/2003 | Huang et al. | 345/619 |
| 6,745,206 B2 * | 6/2004 | Mandler et al. | 707/104.1 |
| 6,757,678 B2 * | 6/2004 | Myllymaki | 707/6 |
| 6,772,165 B2 * | 8/2004 | O'Carroll | 707/101 |
| 6,772,413 B2 * | 8/2004 | Kuznetsov | 717/136 |
| 6,804,677 B2 * | 10/2004 | Shadmon et al. | 707/101 |
| 6,862,590 B2 * | 3/2005 | Nonko et al. | 707/3 |

* cited by examiner

INCREMENTAL BOTTOM-UP CONSTRUCTION OF DATA DOCUMENTS

RELATED APPLICATIONS

This application is related to and claims the benefit of U.S. Provisional Patent application Ser. No. 60/306,256, filed Jul. 17, 2001, which is hereby incorporated by reference.

FIELD OF THE INVENTION

This invention relates generally to the incremental construction of data documents and more particularly to data documents containing multimedia content descriptions.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright©2001, Sony Electronics, Inc., All Rights Reserved.

BACKGROUND OF THE INVENTION

Digital multimedia information is becoming widely distributed though broadcast transmission, such as digital television signals, and interactive transmission, such as the Internet. The information may be in still images, audio feeds, or video data streams. However, the availability of such a large volume of information has led to difficulties in identifying content that is of particular interest to a user. Various organizations have attempted to deal with the problem by providing a description of the information that can be used to search, filter and/or browse to locate particular content. The Moving Picture Experts Group (MPEG) has promulgated a Multimedia Content Description Interface standard, commonly referred to as MPEG-7, to standardize the content descriptions for multimedia information. In contrast to preceding MPEG standards such as MPEG-1 and MPEG-2, which define coded representations of audio-visual content, an MPEG-7 content description describes the structure and semantics of the content and not the content itself.

Using a movie as an example, a corresponding MPEG-7 content description would contain "descriptors" (D), which are components that describe the features of the movie, such as titles for scenes, shots within scenes, time, color, shape, motion, and audio information for the shots. The content description would also contain one or more "description schemes" (DS), which are components that describe relationships among two or more descriptors and/or description schemes, such as a shot description scheme that relates together the features of a shot. A description scheme can also describe the relationship among other description schemes, and between description schemes and descriptors, such as a scene description scheme that relates the different shots in a scene, and relates the title feature of the scene to the shots.

MPEG-7 uses a Data Definition Language (DDL) that specifies the language for defining the standard set of description tools (DS, D) and for defining new description tools and provides a core set of descriptors and description schemes. The DDL definitions for a set of descriptors and description schemes are organized into "schemas" for different classes of content. The DDL definition for each descriptor in a schema specifies the syntax and semantics of the corresponding feature. The DDL definition for each description scheme in a schema specifies the structure and semantics of the relationships among its children components, the descriptors and description schemes. The DDL may be used to modify and extend the existing description schemes and create new description schemes and descriptors.

The MPEG-7 DDL is based on XML (extensible markup language) and the XML Schema standards. The descriptors, description schemes, semantics, syntax, and structures are represented with XML elements and XML attributes. Some of the XML elements and attributes may be optional.

The MPEG-7 content description for a particular piece of content is defined as an instance of an MPEG-7 schema; that is, it contains data that adheres to the syntax and semantics defined in the schema. The content description is encoded in an "instance document" that references the appropriate schema. The instance document contains a set of "descriptor values" for the required elements and attributes defined in the schema, and for any necessary optional elements and/or attributes. For example, some of the descriptor values for a particular movie might specify that the movie has three scenes, with scene one having six shots, scene two having five shots, and scene three having ten shots. The instance document may be encoded in a textual format using XML, or in a binary format, such as the binary format specified for MPEG-7 data, known as "BiM," or a mixture of the two formats.

The instance document is transmitted through a communication channel, such as a computer network, to another system that uses the content description data contained in the instance document to search, filter and/or browse the corresponding content data stream. Typically, the instance document is compressed for faster transmission. An encoder component may both encode and compress the instance document or the functions may be performed by different components. Furthermore, the instance document may be generated by one system and subsequently transmitted by a different system. A corresponding decoder component at the receiving system uses the referenced schema to decode the instance document. The schema may be transmitted to the decoder separately from the instance document, as part of the same transmission, or obtained by the receiving system from another source. Alternatively, certain schemas may be incorporated into the decoder.

Although compression can reduce transmission time by decreasing the size of the instance document, if the description is large, transmitting the entire content description over a network can still take too much time. Therefore, only portions of the instance document may be transmitted to conserve bandwidth. In general, a content description can be modeled as a tree that is composed of a set of sub-trees or fragments. The determination of which fragments to send is application dependent.

A content description may be updated by adding, deleting or replacing description fragments, i.e., descriptors and description schemes, and/or attributes within fragments. The updates are transmitted to the receiving system through a series of packets, or "access units" in the MPEG-7 standard, that contain one or more fragment update units. The decoder on the receiving system updates its existing content description by applying the information in the fragment update units. Typically a fragment update unit consists of a navigation path that directs the decoder to the appropriate locations in the description tree to apply the update, an update command that specifies the type of update to execute, i.e., add, delete, replace, and a fragment payload that identifies the update value for an add or replace command. Because every current update command must specify the correct path to the update locations, the encoder must have prior knowledge of the description tree stored in the decoder before creating and transmitting the fragment update units. Thus, the current fragment update units can only construct the description tree at the decoder from the top down.

SUMMARY OF THE INVENTION

A data document is constructed by attaching a set of child nodes, selected from nodes in an existing data document or a document fragment, at an update location, which is a node in the existing data document or the document fragment that is identified by a navigation path. When the update command is a merge, one or mode nodes ("merge nodes") in the document fragment are identified as update locations, and the nodes in the existing data document are merged as child nodes of the merge nodes in the document fragment. When the update command is a join, a node ("join node") in the existing data document is identified as the update location, and an ordered list specifies which nodes in the existing data document and which nodes in the document fragment are to be joined as the set of child nodes for the join node. The join and merge update commands, navigation paths, and document fragments may transmitted as a series of fragment update units to construct the data document.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

A data document having a tree structure may be constructed from the bottom-up by merging and/or joining nodes in an existing data document with nodes in a document fragment as described herein. Examples of such documents include XML (Extensible Markup Language) documents and multimedia content description documents, in particular those containing descriptions complying with the MPEG-7 standard. Exemplary embodiments are described in terms of multimedia content description documents but the invention is not so limited and one of skill in the art will immediately recognize the applicability of the invention to other types of data documents.

Figure 1A:
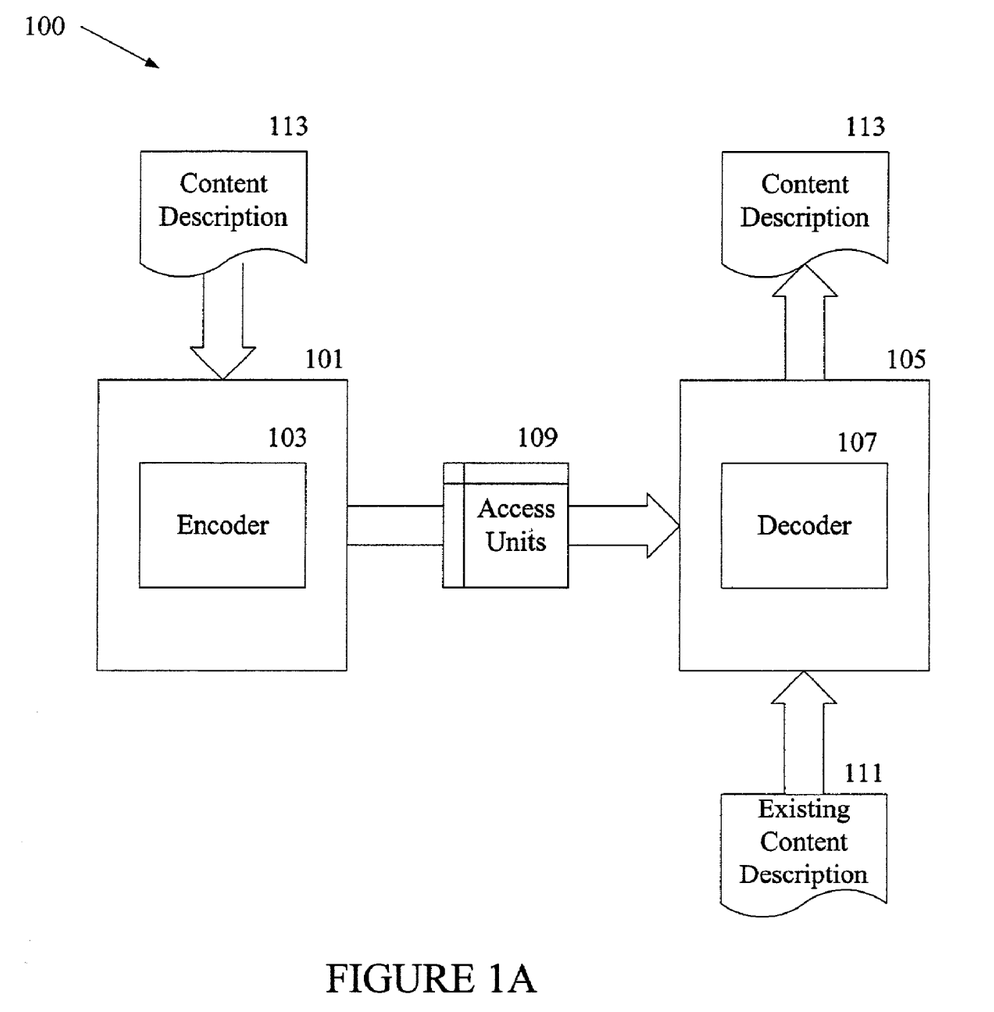
FIGS. 1A–D are diagrams illustrating operations of embodiments of the invention.
Figure 1B:
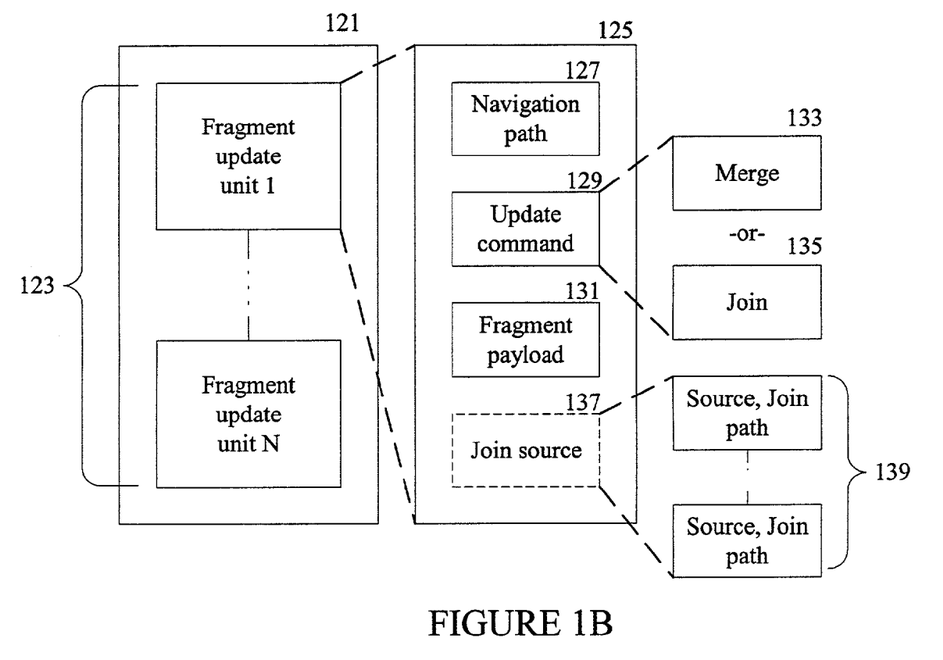

Beginning with an overview of a multimedia content description delivery system 100 as illustrated in FIG. 1A, a content description 113 on a transmitting system 101 is re-created on a receiving system 105 using description fragments transmitted as access units 109. The content description 113 on the receiving system is constructed by a decoder 107 from the bottom up by merging and/or joining fragments in the access units 109 with an existing content description 111 on the receiving system 105 as described further below. An encoder 103 on the transmitting system creates the access units 109 containing the merge and/or join commands and the fragments as described next in conjunction with FIG. 1B. It will be appreciated that although "access unit" is the term used by the MPEG-7 standard, the invention is not so limited and is applicable to the construction of any type of content description. It will be further appreciated that the invention is not limited to the particular arrangement of components illustrated in FIG. 1A. For example, one of skill in the art will immediately recognize that the transmitting system may receive the access units from another system for subsequent transmission An exemplary embodiment of an access unit 121 is illustrated in FIG. 1B. The access unit 121 contains one or more fragment update units 123. Each fragment update unit 125 contains a navigation path 127, an update command 129, and a fragment payload 131. When the update command 129 is a merge command 133 or a join command 135, the navigation path 127 specifies an update location, i.e., a node, in either the existing content description on the receiving system or in the description fragment. The fragment payload 131 contains either the fragment or a reference to the fragment. A set of one or more child nodes selected from the existing content description and/or from the description fragment are attached as child nodes at the update location to build the content description. When the update command 120 contains a join command 135, a join source element 137 (shown in phantom) is also present in the fragment update unit 125. In one embodiment, the join source element 137 is an ordered list of "source, join path" element pairs 139 as will be described in detail in conjunction with FIG. 1D. Fragment update units for a merge or join command may co-exist with fragment update units containing add, delete, replace and reset commands within the access unit 121.

Figure 1C:
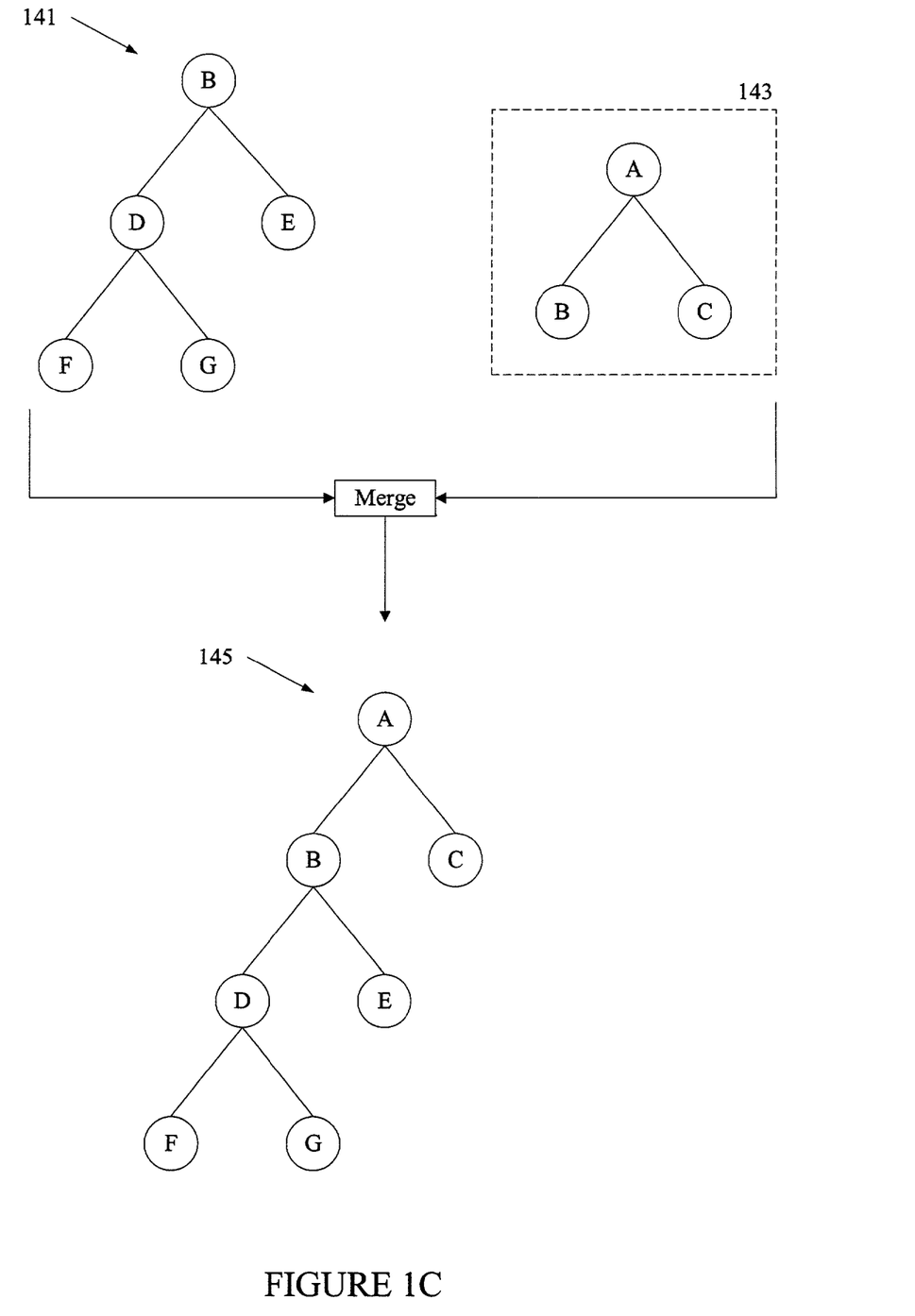

A merge command merges the fragment in the fragment update unit with the existing description tree on the receiving system by attaching the existing description tree to one or more of the nodes, i.e., merge nodes, in the fragment as illustrated in FIG. 1C. Assume the fragment update unit 125 for a merge command contains the fragment 143 as its payload 131, and the navigation path 127 contains a context expression that specifies node B as the update location in the fragment 143. When executed, the merge command sets the fragment 143 as the root of the description tree and replaces node B in the description fragment with the existing description tree 141 to produce a merged description tree 145.

Figure 1D:
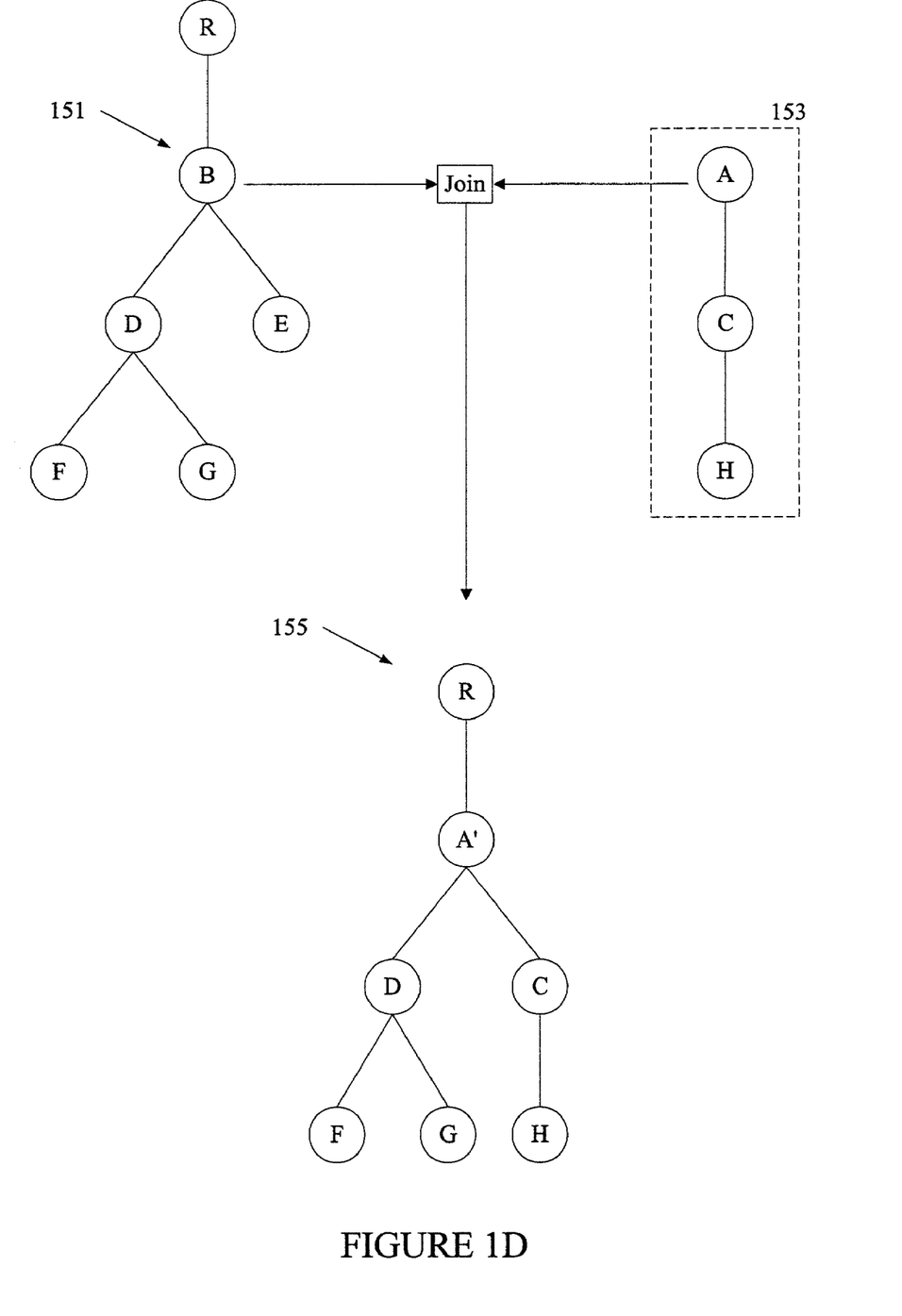

As illustrated in FIG. 1D, a join command joins a fragment in the fragment update unit with a node in an existing description tree to produce a joined description tree. Given an existing description tree 151 and fragment 153 in the fragment update unit, assume that node B in the existing description tree 151 and the fragment 153 are to be joined into a single join node A' in a joined description tree 155. The navigation path 127 contains a context expression that specifies the node B in the description tree 151 as the update location at which to join the fragment description 153. After the fragment description 153 is joined to node B, the result is join node A' in the joined description tree 155. Because each of the nodes A and B may have attributes and sub-trees as children, the join source element 137 in the fragment update unit 125 specifies which children from the two nodes being joined are to be attached as child nodes for the join node A', and in what order they will appear. When a child node is added to the join node, the complete subtree rooted at the designated child is added, i.e., adding a child node includes adding all descendant nodes of the designated child node. In the simplest case, the join operation may result in the concatenation of the children of the two nodes as the children of the join node A' in the following order: first, all children of designated join node in description 153 (i.e. node B), followed by the child nodes of node A. The ordered list of source, element pairs 139 in the join source element 137 enables arbitrarily complicated joins. The source element of a pair specifies that either the existing tree 151 or fragment 153 is the source of a child of the join node A', while the join path element specifies which attributes or sub-trees of the source are to become children of the join node. Thus, as illustrated in FIG. 1D, the join source list contains two source, child path element pairs that specify how to combine the children of node B in the existing description tree 151 and node A in the fragment 153. The first pair indicates that the source is the existing description tree 151 and the child path points to child node D (specified relative to its parent node B) in tree 151. The second pair indicates that the source is the fragment and the child path points to child node C of node A in fragment 153. The resulting child nodes of the join node A' are the subtree rooted at node D, which includes nodes F and G from the existing description tree 151 and the subtree rooted at nodes C, which includes node H from the fragment 153. Note that node E from the tree 151 is not included in this case because it was not designated in the join source list.

Thus, the merge and join commands described make it possible to transmit the parts of a data document as fragments and to construct a new data document from the bottom up.

Figure 2:
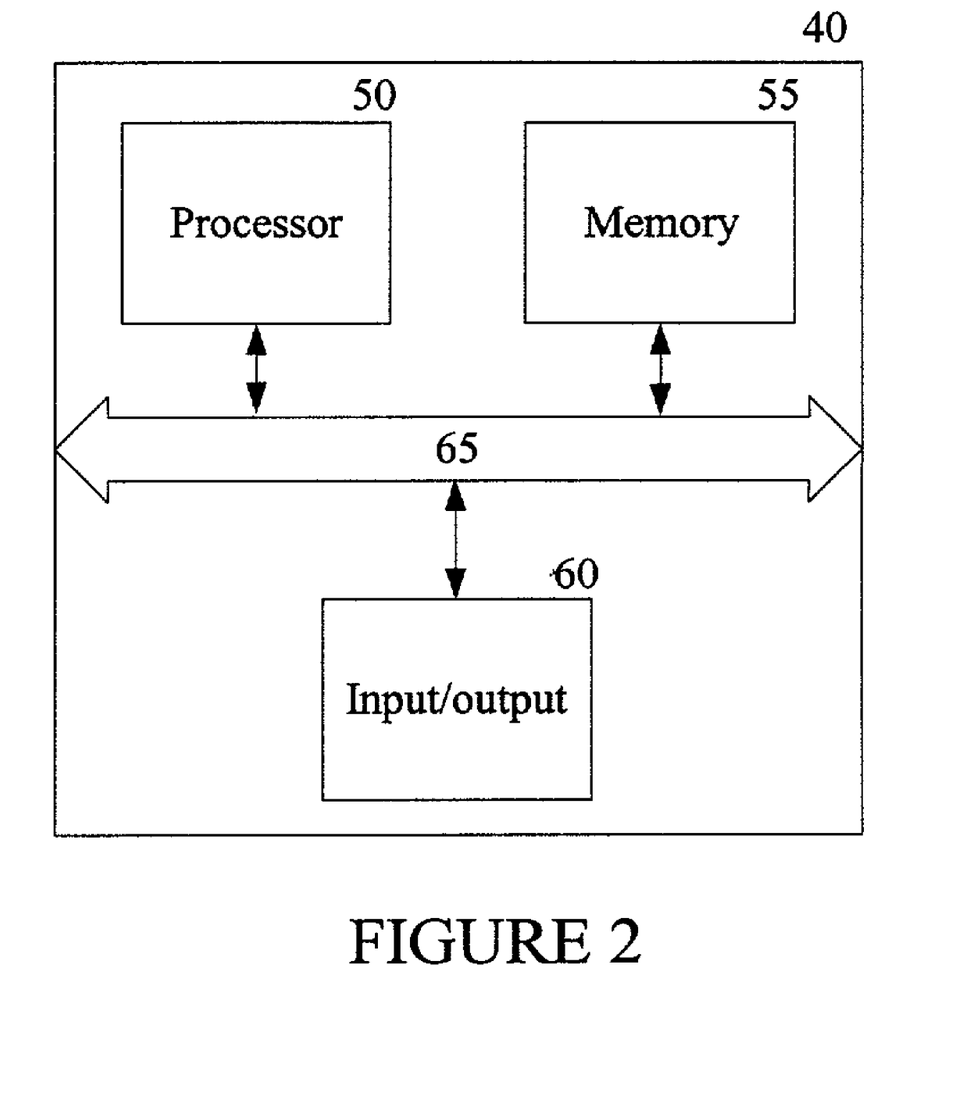
FIG. 2 is a diagram of a computer environment suitable for practicing the invention.

The following description of FIG. 2 is intended to provide an overview of computer hardware and other operating components suitable for implementing the invention, but is not intended to limit the applicable environments. FIG. 2 illustrates one embodiment of a computer system suitable for use as the transmitting and/or receiving system of FIG. 1A. The computer system 40 includes a processor 50, memory 55 and input/output capability 60 coupled to a system bus 65. The memory 55 is configured to store instructions which, when executed by the processor 50, perform the methods described herein. The memory 55 may also store the access units. Input/output 60 provides for the delivery and receipt of the access units. Input/output 60 also encompasses various types of computer-readable media, including any type of storage device that is accessible by the processor 50. One of skill in the art will immediately recognize that the term "computer-readable medium/media" further encompasses a carrier wave that encodes a data signal. It will also be appreciated that the system 40 is controlled by operating system software executing in memory 55. Input/output and related media 60 store the computer-executable instructions for the operating system and methods of the present invention as well as the access units. The encoder 103 and decoder 107 shown in FIG. 1A may be separate components coupled to the processor 50, or may be embodied in computer-executable instructions executed by the processor 50. In one embodiment, the computer system 40 may be part of, or coupled to, an ISP (Internet Service Provider) through input/output 60 to transmit or receive the access units over the Internet. It is readily apparent that the present invention is not limited to Internet access and Internet web-based sites; directly coupled and private networks are also contemplated.

It will be appreciated that the computer system 40 is one example of many possible computer systems that have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Next, the particular methods of the invention are described in terms of computer software with reference to a series of flow diagrams in FIGS. 3A–D. The methods constitute computer programs made up of computer-executable instructions illustrated as blocks (acts) in FIGS. 3A–D. Describing the methods by reference to a flow diagram enables one skilled in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the methods illustrated in Figures (flow diagrams) without departing from the scope of the invention and that no particular order is implied by the arrangement of blocks shown and described herein.

Figure 3A:
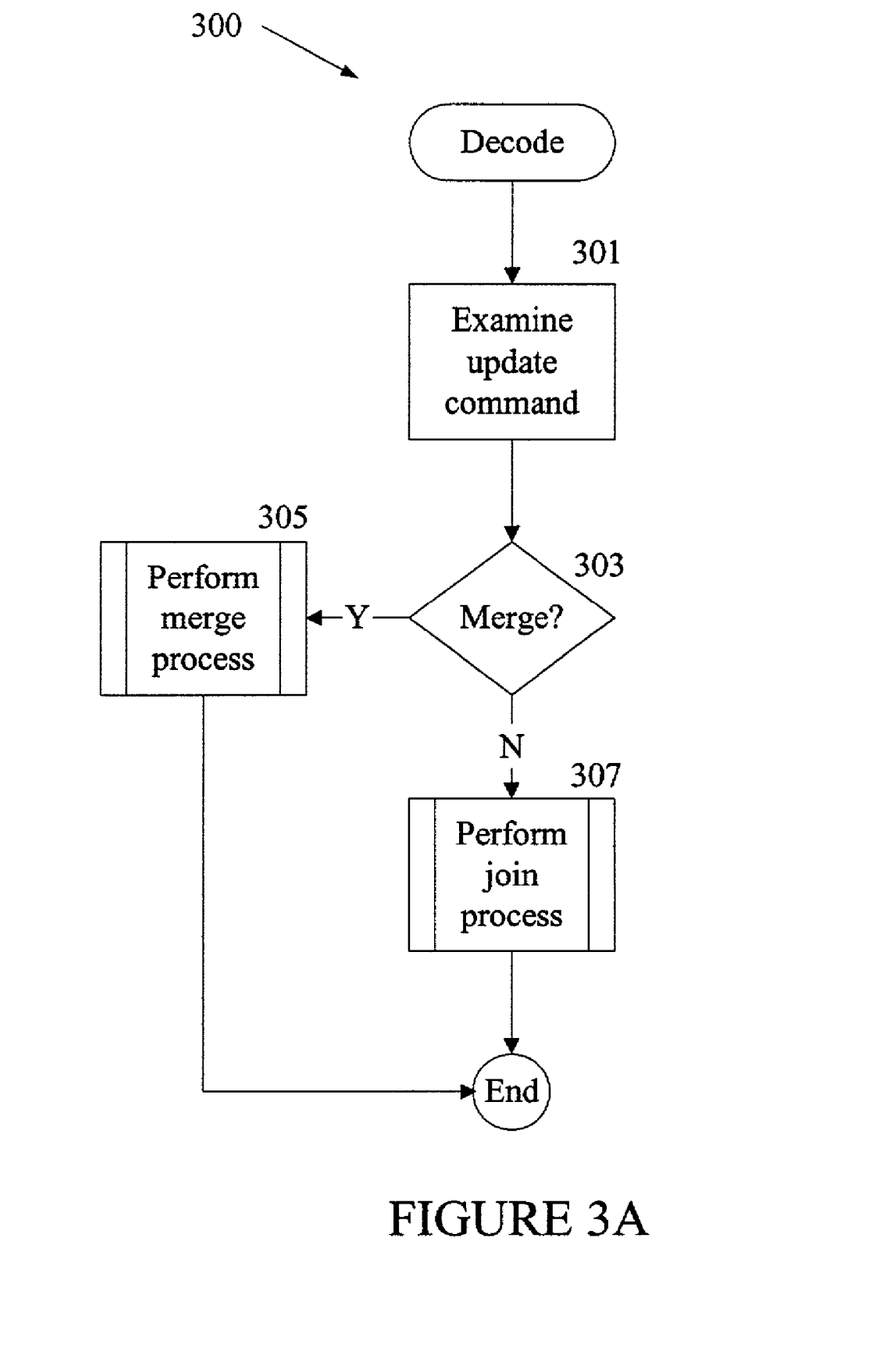
FIG. 3A is a flow diagram of a decode method to be performed by a receiving system according to the embodiment of FIG. 1B.
Figure 3B:
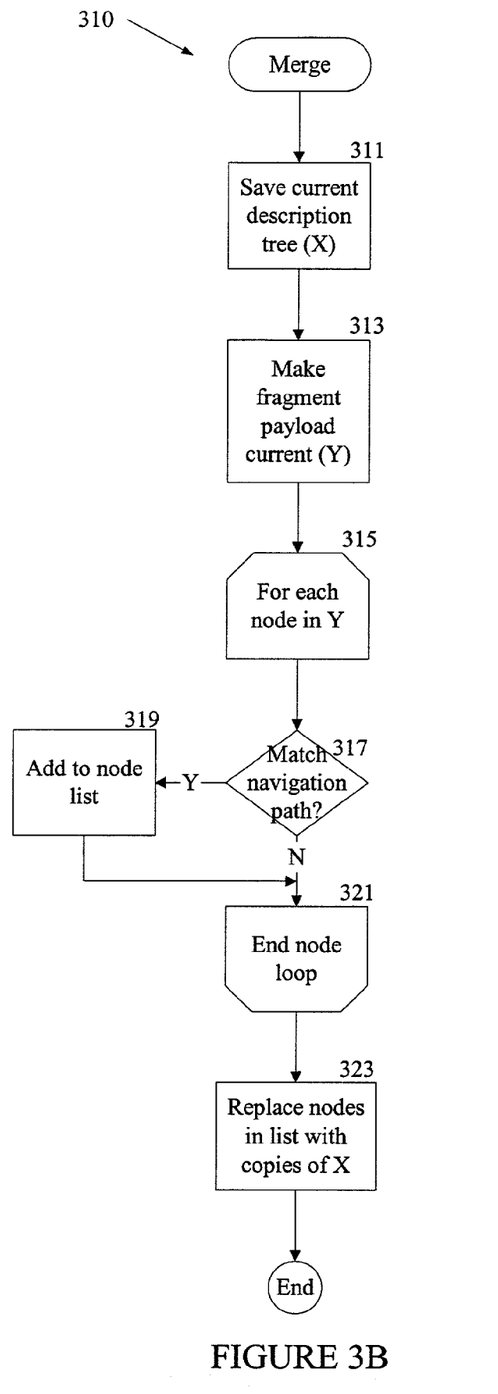
FIGS. 3B–C are flow diagram of methods to be performed in conjunction with the method of FIGS. 1A.

FIG. 3A illustrates a decode method 300 executed by the receiving system to process fragment update units for merge or join commands. The method 300 may be executed by a decoder on the receiving system or operate in a separate module. The method 300 is intended to operate in conjunction with other methods that decode fragment update units containing other update commands, such as add, delete, replace and reset, and such methods are not further described. The command in a fragment update unit is examined at block 301. If the update is a merge command (block 303), a merge method illustrated in FIG. 3B is executed (block 305). Otherwise, a join method illustrated in FIG. 3C is executed (block 307).

Turning now to FIG. 3B, when the merge method 310 is invoked, it saves the existing description tree on the receiving system (X) (block 311) and sets the fragment payload as the current tree (Y) (block 313). The merge method 310 executes a node loop for each node in Y starting at block 315 and ending at block 321. At block 317, the merge method 310 determines if the node matches the context expression specified in the navigation path in the fragment update unit and adds a matching node to a node list at block 319. Once all the nodes in Y have been evaluated, copies of the saved description tree X replace each of the nodes (and their subtrees, if any) in the node list (block 323).

Figure 3C:
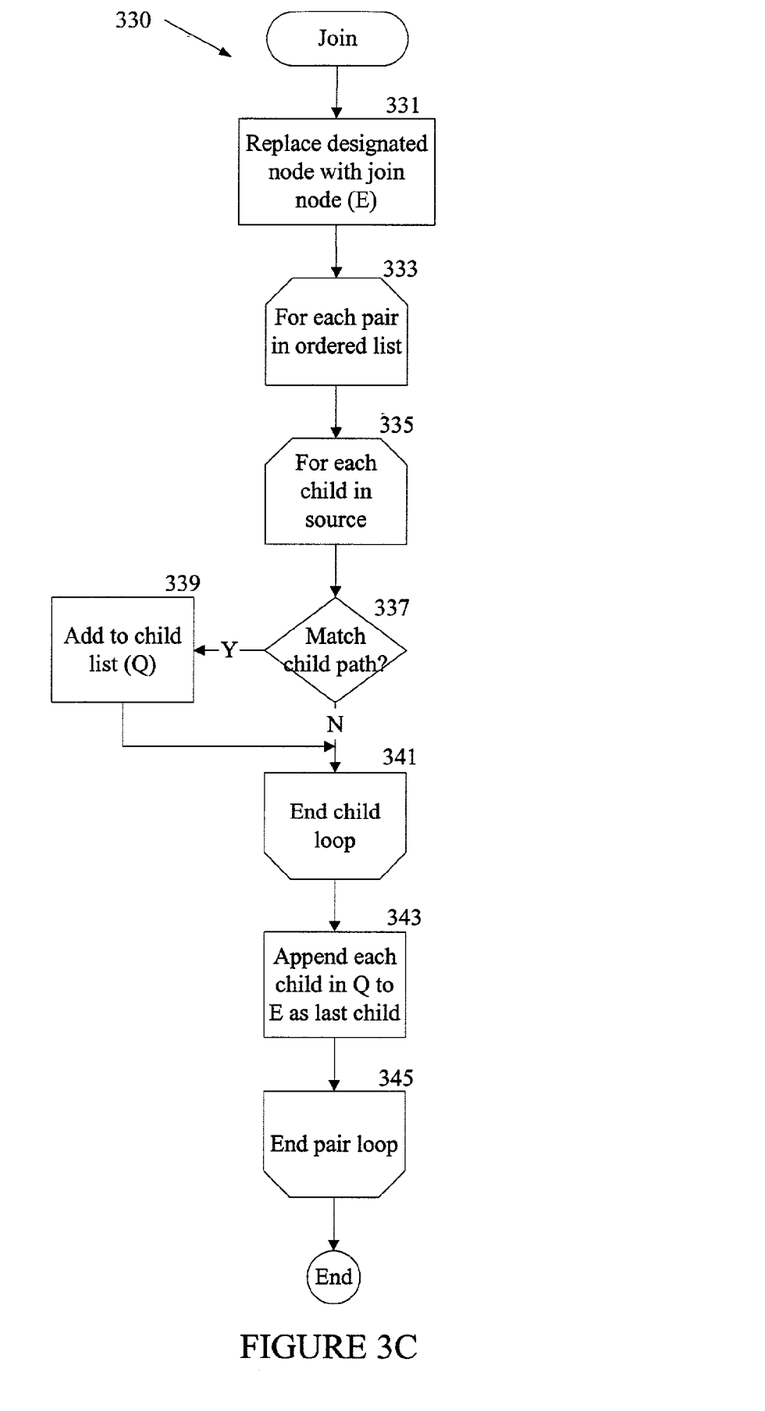

The join method 330 illustrated in FIG. 3C replaces the node (and any of its subtrees) designated in the navigation path with a join node (E) (block 331). The element and schema type for the join node are that of the root node of the fragment. For each pair in the ordered list in the join source element, the join method 330 executes a pair loop beginning at block 333 and ending at block 345. Within the pair loop, the source element is used to determine the current source, either the existing description tree or the fragment, and each child node for the current source is evaluated in a child loop starting at block 335 and ending at block 341. If the child node matches the join path element at block 337, the child node is added to a list Q at block 339. When all the child nodes of the current source have been evaluated, the child nodes in list Q are appended to the join node E, with each being appended as the last child (block 343). If the same child attribute occurs more than once during the joining process, the first child attribute is appended and subsequent duplicate child attributes are ignored. When the last pair has been evaluated, all child nodes for the join node have been appended and the join process is complete.

In an embodiment not illustrated, if the join source element 137 is empty, a default ordered list is used. The default ordered list contains a first pair that specifies all the child nodes of the existing description tree first and a second pair that specifies all the child nodes of the root node of the fragment. The default ordered list results in a concatenation of all the child nodes under join node in the order of the first and second pairs.

Figure 3D:
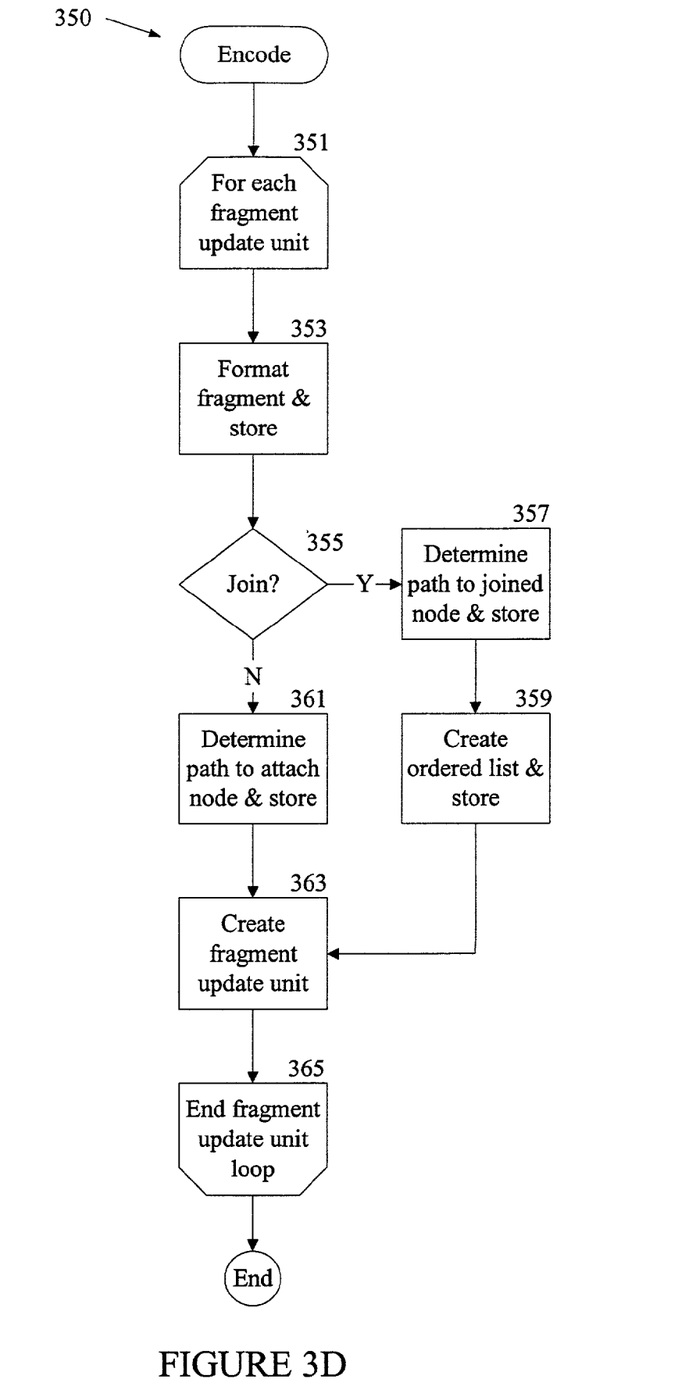
FIG. 3D is a flow diagram of an encode method to be performed by a transmitting system according to the embodiment of FIG. 1B.

An encode method 350 that encodes fragment update units for merge and join commands is illustrated in FIG. 3D. The method 350 is invoked on a system when a new content description needs to be constructed on a receiving system. The method 350 may be incorporated into an encoder or operate as a separate module, and may be performed by the transmitting system or by another system that transfers the encoded access units to the transmitting system. The method 300 may be executed by a decoder on the receiving system or operate in a separate module. The method 300 is intended to operate in conjunction with other methods that encode fragment update units for other update commands, such as add, delete, replace and reset, and such methods are not further described.

For each merge or join fragment update unit to be sent in an access unit, the method 350 performs a processing loop represented by blocks 351 until 365. The fragment payload is formatted with either the fragment to merge or join, or a reference to the fragment (block 353). If the update command is a join (block 355), the context expression to specify the location of the join node in the new description tree is determined and stored in the navigation path (block 357). The ordered list of pairs that specify the children of the join node is created and stored in the join source element (block 359). If the update command is a merge, the context expression for the attachment nodes in the fragment is determined and stored in the navigation path (block 361). The navigation path, fragment payload and join source, when present, are combined with the merge/join command to create the fragment update unit (block 363).

When the content descriptions are coded in XML, such as MPEG-7 content descriptions, in one embodiment the navigation and join paths are location path expressions in the XML path language (XPath). An XPath location path consists of a set of location steps that walk through nodes in a tree structure. Each step is relative to a set of context nodes specified by the previous step. A location step consists of three parts:

1. an axis that specifies the relationship in the tree between the nodes selected by the step and the context node(s), e.g., parent, child, ancestor, sibling, attribute, etc.;
2. a node test that specifies the node type of the nodes selected by the step, e.g., text, attribute, element, etc.; and
3. zero or more predicates that are used to filter the nodes selected by the step, e.g., * (select all), text, @attribute-name, order-number, etc.

In another embodiment specific to the BiM encoding of MPEG-7 access units, the paths are relative to the XML Schema type corresponding to the type of the fragment.

Additionally, fragment update units for the merge and join commands may be specified as an extension of the existing MPEG-7 syntax for access units as follows:

```
<complexType name="FragmentUpdateUnitType">
    <element name="Navigation" type="mpeg7:XpathType"
        minOccurs="1"/>
    <element name="JoinSource" minOccurs="0" maxOccurs="unbounded">
        <simpleContent>
            <simpleType>
                <extension base="mpeg7:XpathType"/>
                <attribute name="source">
                    <simpleType>
                        <restriction base="string">
                            <enumeration value="current"/>
                            <enumeration value="fragment"/>
                        </restriction>
                    </simpleType>
                </attribute>
```

```
        </simpleType>
      </simpleContent>
    </element>
    <element name="UpdateCommand"
      type="mpeg7:UpdateCommandType" minOccurs="1"/>
    <element name="FragmentPayload" type="mpeg7:FragmentPayloadType"
      <minOccurs="0" maxOccurs="1"/>
</complexType>
``` where the Navigation element corresponds to the navigation path 127 in FIG. 1B and the JoinSource element corresponds to the join source element 137. The value "current" in the source part of the JoinSource element specifies the existing description tree on the receiving system, while the value "fragment" specifies the fragment contained in the fragment payload.

The syntax for the UpdateCommand element may be modified to include merge and join commands as follows:

```
<simpleType name="UpdateCommandType">
    <restriction base="string">
        <enumeration value="AddFragment"/>
        <enumeration value="DeleteFragment"/>
        <enumeration value="ReplaceFragment"/>
        <enumeration value="Reset"/>
        <enumeration value="MergeFragment"/>
        <enumeration value="JoinFragment"/>
    </restriction>
</simpleType>
``` in which "MegeFragment" and "JoinFragment" represent the merge and join commands 133, 135 for the update command 129.

The MPEG-7 syntax for the fragment payload does not need to be modified to accommodate the merge and join commands.

A multimedia content description system that transmits and constructs content descriptions from the bottom up has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to MPEG-7 is meant to include all environments that provide content descriptions. Therefore, it is manifestly intended that this invention be limited only by the following claims and equivalents thereof.

What is claimed is:

1. A computerized method of constructing a data document represented as a tree from an existing data document and a document fragment comprising:

receiving, from a transmitting system, a navigation path, an update command and the document fragment to construct the data document, wherein the navigation path, the update command and the document fragment are sent by the transmitting system instead of a copy of the data document stored on the transmitting system;

identifying an update location using the navigation path, wherein the update location is one of a join node in the existing data document and a merge node in the document fragment; and attaching a set of child nodes at the update location in accordance with the update command, wherein the set of child nodes is selected from at least one of the existing data document and the document fragment.

2. The computerized method of claim 1, wherein, when the update command is a merge command, the update location is a merge node in the document fragment and attaching the set of child nodes comprises:

selecting the set of child nodes from the existing data document; and merging the set of child nodes at the merge node.

3. The computerized method of claim 2, wherein selecting the set of child nodes from the existing data document comprises selecting all nodes in the existing data document.

4. The computerized method of claim 1, wherein, when the update command is a join command, the update location is a join node in the existing data document and attaching the set of child nodes comprises:

selecting the set of child nodes from the document fragment and the existing data document using an ordered list; and joining the set of child nodes at the join node.

5. The computerized method of claim 4, wherein the set of child nodes are joined in an order specified by the ordered list.

6. The computerized method of claim 4, wherein the ordered list comprises a plurality of element pairs and each element pair comprises:

a source element that specifies one of the document fragment and the existing data document as a source; and a join path that specifies a node in the source to be included in the set of child nodes.

7. The computerized method of claim 4, wherein the ordered list is a default ordered list.

8. The computerized method of claim 1, wherein the navigation path is an address that identifies the update location relative to a context node.

9. The computerized method of claim 8, wherein the address is expressed as an XML XPath location path when the data documents are coded in XML (extensible markup language).

10. The computerized method of claim 1, wherein the data documents and document fragment contain content descriptions.

11. The computerized method of claim 10, wherein the content descriptions are compliant with MPEG-7 standards.

12. The computerized method of claim 1, wherein the data documents and document fragment are coded in XML.

13. The computerized method of claim 12, wherein the data documents and document fragment conform to an XML schema document associated with the data documents and document fragment.

14. The computerized method of claim 1, wherein the navigation path and the update command are received in a fragment update unit, the fragment update unit further comprising:
a fragment payload identifying the document fragment.

15. The computerized method of claim 14, wherein the fragment payload is selected from the group consisting of a document fragment and a document fragment reference.

16. The computerized method of claim 14, wherein, when the update command is a join command, the fragment update unit further comprises:
an ordered list that specifies the set of child nodes.

17. The computerized method of claim 14 further comprising:
sending the fragment update unit as part of an access unit.

18. The computerized method of claim 17 further comprising:
selecting the update command;
formatting the fragment payload;
calculating the navigation path;
creating an ordered list of source and join path elements when the update command is a join; and
creating the fragment update unit from the navigation path, the update command, the fragment payload, and the ordered list if required.

19. The computerized method of claim 1 further comprising:
receiving an ordered list that specifies the set of child nodes when the update command is a join command.

20. The computerized method of claim 1 further comprising:
sending the navigation path, the update command, and the document fragment.

21. The computerized method of claim 20 further comprising:
sending an ordered list that specifies the set of child nodes when the update command is a join command.

22. A computerized method of constructing a data document represented as a tree from an existing data document and a document fragment comprising:
sending, to a receiving system, a navigation path, an update command, and a document fragment, wherein the navigation path identifies an update location that is one of a join node in the existing data document and a merge node in the document fragment at which to attach a set of child nodes selected from at least one of the existing data document and the document fragment in accordance with the update command, wherein the navigation path, update command, and document fragment are sent by a transmission system instead of a copy of the data document stored on the transmitting system.

23. The computerized method of claim 22 further comprising:
sending an ordered list that specifies the set of child nodes when the update command is a join command.

24. The computerized method of claim 22 further comprising:
selecting the update command;
formatting a fragment payload to identify the document fragment;
calculating the navigation path;
creating an ordered list of source and join path elements when the update command is a join; and
creating a fragment update unit from the navigation path, the update command, the fragment payload, and the ordered list if required.

25. The computerized method of claim 24 further comprising:
sending the fragment update unit as part of an access unit.

26. The computerized method of claim 24, wherein the fragment payload is selected from the group consisting of a document fragment and a document fragment reference.

27. The computerized method of claim 22, wherein the navigation path is an address that identifies the update location relative to a context node.

28. The computerized method of claim 27, wherein the address is expressed as an XML XPath location path when the data documents are coded in XML (extensible markup language).

29. The computerized method of claim 22, wherein the data documents and document fragment contain content descriptions.

30. The computerized method of claim 29, wherein the content descriptions are compliant with MPEG-7 standards.

31. The computerized method of claim 22, wherein the data documents and document fragment are coded in XML.

32. The computerized method of claim 31, wherein the data documents and document fragment conform to an XML schema document associated with the data documents and document fragment.

33. A computer-readable storage medium having executable instruction to cause a computer to perform a method of constructing a data document represented as a tree from an existing data document and a document fragment, the method comprising:
receiving, from a transmitting system, a navigation path, an update command and the document fragment to construct the data document, wherein the navigation path, the update command and the document fragment are sent by the transmitting system instead of a copy of the data document stored on the transmitting system;
identifying an update location using the navigation path, wherein the update location is one of a join node in the existing data document and a merge node in the document fragment; and
attaching a set of child nodes at the update location in accordance with the update command, wherein the set of child nodes is selected from at least one of the existing data document and the document fragment.

34. The computer-readable medium of claim 33, wherein, when the update command is a merge command, the update location is a merge node in the document fragment and attaching the set of child nodes comprises:
selecting the set of child nodes from the existing data document; and
merging the set of child nodes at the merge node.

35. The computer-readable medium of claim 34, wherein selecting the set of child nodes from the existing data document comprises selecting all nodes in the existing data document.

36. The computer-readable medium of claim 33, wherein, when the update command is a join command, the update location is a join node in the existing data document and attaching the set of child nodes comprises:
selecting the set of child nodes from the document fragment and the existing data document using an ordered list; and
joining the set of child nodes at the join node.

37. The computer-readable medium of claim 36, wherein the set of child nodes are joined in an order specified by the ordered list.

38. The computer-readable medium of claim 36, wherein the ordered list comprises a plurality of element pairs and each element pair comprises:
   a source element that specifies one of the document fragment and the existing data document as a source; and
   a join path that specifies a node in the source to be included in the set of child nodes.

39. The computer-readable medium of claim 36, wherein the ordered list is a default ordered list.

40. The computer-readable medium of claim 33, wherein the navigation path is an address that identifies the update location relative to a node context.

41. The computer-readable medium of claim 40, wherein the address is expressed as an XML XPath location path when the data documents are coded in XML (extensible markup language).

42. The computer-readable medium of claim 33, wherein the data documents and document fragment contain content descriptions.

43. The computer-readable medium of claim 33, wherein the data documents and document fragment are coded in XML.

44. The computer-readable medium of claim 43, wherein the data documents and document fragment conform to an XML schema document associated with the data documents and document fragment.

45. The computer-readable medium of claim 42, wherein the content descriptions are compliant with MPEG-7 standards.

46. The computer-readable medium of claim 33, wherein the navigation path and the update command are received in a fragment update unit, the fragment update unit further comprising:
   a fragment payload identifying the document fragment.

47. The computer-readable medium of claim 46, wherein the fragment payload is selected from the group consisting of a document fragment and a document fragment reference.

48. The computer-readable medium of claim 46, wherein, when the update command is a join command, the fragment update unit further comprises:
   an ordered list that specifies the set of child nodes.

49. The computer-readable medium of claim 46, wherein the method further comprises:
   sending the fragment update unit as part of an access unit.

50. The computer-readable medium of claim 49, wherein the method further comprises:
   selecting the update command;
   formatting the fragment payload;
   calculating the navigation path;
   creating an ordered list of source and join path elements when the update command is a join; and
   creating the fragment update unit from the navigation path, the update command, the fragment payload, and the ordered list if required.

51. The computer-readable medium of claim 33, wherein the method further comprises:
   receiving an ordered list that specifies the set of child nodes when the update command is a join command.

52. the computer-readable medium of claim 33, wherein the method further comprises:
   sending the navigation path, the update command, and the document fragment.

53. The computer-readable medium of claim 52, wherein the method further comprises:
   sending an ordered list that specifies the set of child nodes when the update command is a join command.

54. A computer-readable storage medium having executable instructions to cause a computer to perform a method of constructing a data document represented as a tree from an existing data document and a document fragment, the method comprising:
   sending, to a receiving system, a navigation path, an update command, and a document fragment, wherein the navigation path identifies an update location that is one of a join node in the existing data document and a merge node in the document fragment at which to attach a set of child nodes selected from at least one of the existing data document and the document fragment in accordance with the update command, wherein the navigation path, update command and document fragment are sent by a transmitting system instead of a copy of the data document stored on the transmitting system.

55. The computer-readable medium of claim 54, wherein the method further comprises:
   sending an ordered list that specifies the set of child nodes when the update command is a join command.

56. The computer-readable medium of claim 54, wherein the method further comprises:
   selecting the update command;
   formatting a fragment payload to identify the document fragment;
   calculating the navigation path;
   creating an ordered list of source and join path elements when the update command is a join; and
   creating a fragment update unit from the navigation path, the update command, the fragment payload, and the ordered list if required.

57. The computer-readable medium of claim 56, wherein the method further comprises:
   sending the fragment update unit as part of an access unit.

58. The computer-readable medium of claim 56, wherein the fragment payload is selected from the group consisting of a document fragment and a document fragment reference.

59. The computer-readable medium of claim 54, wherein the navigation path is an address that identifies the update location relative to a context node.

60. The computer-readable medium of claim 59, wherein the address is expressed as an XML XPath location path when the data documents are coded in XML (extensible markup language).

61. The computer-readable medium of claim 54, wherein the data documents and document fragment contain content descriptions.

62. The computer-readable medium of claim 61, wherein the content descriptions are compliant with MPEG-7 standards.

63. The computer-readable medium of claim 54, wherein the data documents and document fragment are coded in XML.

64. The computer-readable medium of claim 63, wherein the data documents and document fragment conform to an XML schema document associated with the data documents and document fragment.

65. A system comprising:
   a processor coupled to a memory through a bus;
   a network interface coupled to the processor through the bus to receive, from a transmitting system, a navigation path, an update command and a document fragment to construct a data document, wherein the navigation path, the update command and the document fragment are sent by the transmitting system instead of a copy of the data document stored on the transmitting system; and a decode process executed by the processor from the memory to cause the processor to identify an update location using the navigation path, wherein the update location is one of a join node in an existing data document and a merge node in the document fragment, and to attach a set of child nodes at the update location in accordance with an update command, wherein the set of child nodes is selected from at least one of the existing data document and the document fragment.

66. The system of claim 65, wherein, when the update command is a merge command, the update location is a merge node in the document fragment, and the decode process further causes the processor to select the set of child nodes from the existing data document, and to merge the set of child nodes at the merge node when attaching the set of child nodes.

67. The system of claim 66, wherein the decode process further causes the processor to select all nodes in the existing data document.

68. The system of claim 65, wherein, when the update command is a join command, the update location is a join node in the existing data document, and the decode process further causes the processor to select the set of child nodes from the document fragment and the existing data document using an ordered list and to join the set of child nodes at the join node when attaching the set of child nodes.

69. The system of claim 68, wherein the decode process further causes the processor to join the set of child nodes in an order specified by the ordered list.

70. The system of claim 68, wherein the ordered list comprises a plurality of element pairs and each element pair comprises:

a source element that specifies one of the document fragment and the existing data document as a source; and a join path that specifies a node in the source to be included in the set of child nodes.

71. The system of claim 68, wherein the ordered list is a default ordered list.

72. The system of claim 65, wherein the navigation path is an address that identifies the update location relative to a context node.

73. The system of claim 72, wherein the address is expressed as an XML XPath location path when the data documents are coded in XML (extensible markup language).

74. The system of claim 65, wherein the data documents and document fragment contain content descriptions.

75. The system of claim 74, wherein the content descriptions are compliant with MPEG-7 standards.

76. The system of claim 65, wherein the data documents and document fragment are coded in XML.

77. The system of claim 76, wherein the data documents and document fragment conform to an XML schema document associated with the data documents and document fragment.

78. The system of claim 65, wherein the navigation path and the update command are received in a fragment update unit, the fragment update unit further comprising:

a fragment payload identifying the document fragment.

79. The system of claim 78, wherein the fragment payload is selected from the group consisting of a document fragment and a document fragment reference.

80. The system of claim 78, wherein, when the update command is a join command, the fragment update unit further comprises:

an ordered list that specifies the set of child nodes.

81. The system of claim 78, wherein the decode process further cause the processor to receive an ordered list that specifies the set of child nodes through the bus when the update command is a join command.

82. A system comprising:

a processor coupled to a memory through a bus;

a network interface coupled to the processor through the bus; and an encode process executed by the processor from the memory to cause the processor to send, to a receiving system, a navigation path, an update command, and a document fragment through the network interface to construct a data document, wherein the navigation path identifies an update location that is one of a join node in the existing data document and a merge node in the document fragment at which to attach a set of child nodes selected from at least one of the existing data document and the document fragment in accordance with the update command, wherein the navigation path, update command and document fragment are sent by the system instead of a copy of the data document stored in the memory of the system.

83. The system of claim 82, wherein the decode process further causes the processor to send an ordered list that specifies the set of child nodes through the network interface when the update command is a join command.

84. The system of claim 82, wherein the decode process further causes the processor to select the update command, format a fragment payload to identify the document fragment, calculate the navigation path, create an ordered list of source and join path elements when the update command is a join, and create a fragment update unit from the navigation path, the update command, the fragment payload, and the ordered list if required.

85. The system of claim 84, wherein the decode process further causes the processor to send the fragment update unit through the network interface as part of an access unit.

86. The system of claim 84, wherein the fragment payload is selected from the group consisting of a document fragment and a document fragment reference.

87. The system of claim 82, wherein the navigation path is an address that identifies the update location relative to a context node.

88. The system of claim 87, wherein the address is expressed as an XML XPath location path when the data documents are coded in XML (extensible markup language).

89. The system of claim 82, wherein the data documents and document fragment contain content descriptions.

90. The system of claim 89, wherein the content descriptions are compliant with MPEG-7 standards.

91. The system of claim 82, wherein the data documents and document fragment are coded in XML.

92. The system of claim 91, wherein the data documents and document fragment conform to an XML schema document associated with the data documents and document fragment.

* * * * *